3,218,476
MEANS FOR THE IGNITION OF PARALLEL-WORKING RECTIFIER GATE PATHS
Lennart Hansson, Ostersund, Sweden, assignor to Allmanna Svenska Elektriska Aktiebolaget, Vasteras, Sweden, a Swedish corporation
Filed Feb. 21, 1963, Ser. No. 271,536
Claims priority, application Sweden, Feb. 23, 1962, 1,953/62
6 Claims. (Cl. 307—88.5)

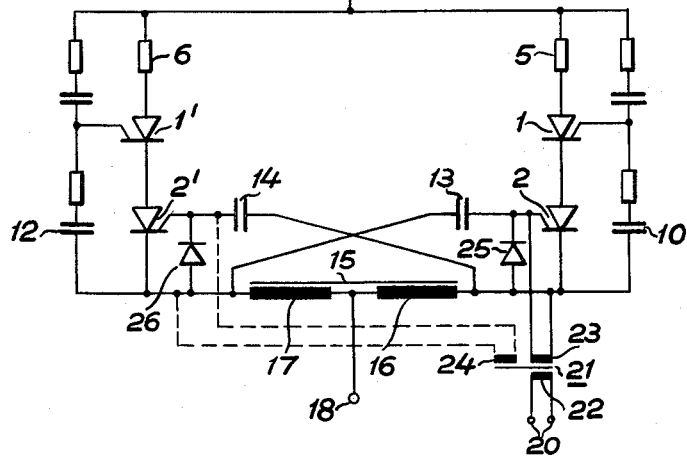
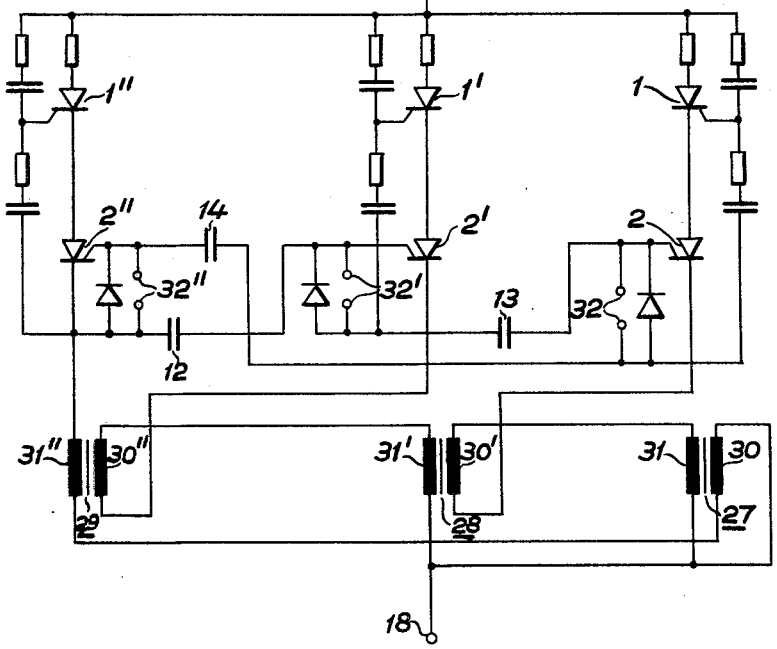

With parallel-working rectifier gates of semi-conductor type of greatest importance that all the valves, or if there are two or more parallel-working paths each consisting of series coupled gates, that all the paths ignite simultaneously so that the load is evenly distributed between them. With converter arrangements consisting of controllable semi-conductor gates, the gates are ignited by means of an ignition pulse being fed to them between the ignition electrode and the cathode of the gates. The time difference between the ignition of the different parallel-working paths must not exceed a few microseconds, since semi-conductor gates as is known have a very small overloading capacity. Difference in ignition times is attained firstly on the basis of varying ignition data in the controllable gates in combination with a somewhat different frontal slope of the ignition pulses to the parallel-working gate paths.

The present invention relates to a means for igniting parallel-working gate paths, each consisting of one or more controllable semi-conductor gates connected in series, which ignition means ensures a simultaneous ignition of all the parallel-working paths with at the most a few microseconds in time difference. As is usual, the paths are series connected with current-equalising impedances for dividing the load current equally between the paths, for which the current equalizing impedances in a way known per se may consist of resistances, inductances or transformer connected load equalizing windings. The invention is characterised in that at least one gate in a path is arranged to be fed with ignition pulses from a pulse device for igniting this or these paths and that at least the voltages which appear over the current-equalizing impedance in one of these paths are arranged to be fed at least to the path which are not fed with ignition pulses from the pulse device. According to the invention a voltage generating element already present in the converter connection is made use of for obtaining ignition voltages to at least some of the gate paths and therefore the invention may be carried out without any greater costs. This has a very great advantage compared with other feasible alternatives, e.g., impulse transformers connected in series with each gate path for the generation of ignition pulses to other gate paths.

The invention will be described in the following with reference to the drawing, where FIGURE 1 shows a schematic drawing of a part of a converter, which part consists of two parallel-working gate paths and FIGURE 2 an alternative embodiment of a similar converter part with three parallel-working gate paths.

The converter part according to FIGURE 1 consists of two parallel-working gate paths each consisting of two series connected controllable semi-conductor gates 1 and 2, and 1' and 2', respectively, e.g., pnpn gates, so-called thyristors, and a fuse 5 and 6 respectively. The gate paths are at their end points on the one side joined to the connection terminal 19 and on the other side via their windings 16 and 17 respectively in a current-equalizing reactor 15 to the connection terminal 18, which current-equalizing reactor has the task of dividing the load currents equally between the two gate paths. The converter part is intended to be ignited from outside by means of an ignition device connected to the connection terminal 20, from whence ignition pulses are transmitted via a signal transformer 21 with primary winding 22 and secondary winding 23 to the converter gate 2 between its ignition electrode and cathode. The ignition pulses originating from the ignition device thus ignite the gate 2, whereby the capacitor 10 in a way known per se is discharged through the ignition electrode of the gate 1 so that this also ignites. Now that the whole gate path has become conductive a voltage appears over the windings of the current-equalizing reactor 15, which voltage is fed to the ignition current path of the gate 2' in series with the capacitor 14. The capacitor 14 has the task of limiting the ignition power fed to the current path of the gate. Since the gate 2' ignites, the capacitor 12 is discharged through the ignition electrode of the gate 1', so that this also ignites. The load current is now with the aid of the current-equalizing reactor 15 divided equally between the two gate paths.

The gates 25 and 26 have the object of limiting the voltages over the cathode-ignition electrodes of the gates 2 and 2', respectively, to a safe value.

With converter connections it is usually required that they should be able to work with full load even if one gate path as a result of a fault, for example in a gate, is disconnected by means of a safety device. In order to fulfill this requirement the converter arrangement according to FIGURE 1 may also be provided with an ignition connection between the signal transformer 21 and the gate 2'. During normal operation it is then of no significance which of the gate paths ignites first, since the string which ignites first releases the ignition of the other path via the current-equalizing reactor 15. If the one path is now disconnected by means of a safety device, the other path is still ignited by means of ignition pulses from the signal transformer 21.

FIGURE 2 shows the invention applied to a converter arrangement consisting of three parallel-working paths, each consisting of two series connected semi-conductor gates 1 and 2, and 1' and 2', 1" and 2" respectively. The gate paths are, for the purpose of current equalizing, series connected with windings of three current-equalizing reactors 27, 28 and 29, each with two windings 30 and 31, 30', 31', and 30", 31", respectively. The windings are so arranged that a current which flows through the winding 30 cancels or resists the magnetic flow which is generated by a current of the same magnitude in the winding 31. When equal currents run through all gate paths no voltage therefore appears over the current-equalizing reactances. The bottom valves 2, 2', 2" of the converter arrangement are arranged to be fed with ignition current pulses via the connection terminals 32, 32' and 32" respectively. In the same way as described in connection with FIGURE 1, the gate path which ignites first will release the ignition of another gate path so that this also ignites. The mutual ignition is in this case arranged so that it forms a closed chain, in which an ignition of the right-hand gate path releases the ignition of the left-hand gate path, which in its turn, when it ignites, releases the ignition of the centre gate path. If the left-hand path ignites first it will release the ignition of the centre string and thereafter the right-hand string.

The invention has been described above in connection with the two figures of the drawing, which however is only intended to show two of many feasible applications of an ignition means according to the invention. Thus, the invention is not limited to converter arrangements with two or three parallel-working gate paths, but may also be applied to similar ones consisting of an arbitrary number of paths, where the current equalizing between these can be attained by means of current-equalizing impedances.

I claim:

1. Means for simultaneous ignition of parallel-working rectifier gate paths, each path comprising at least one controllable semi-conductor rectifier gate, inductively coupled current equalizing reactance means connected in series with said rectifier gate paths for dividing the load current equally between said rectifier gate paths, a pulse device supplying ignition pulses connected to the ignition electrode of a rectifier in at least one of said rectifier gate paths, one end of the current equalizing reactance means of at least one of said rectifier gate paths being connected to the ignition electrode of a rectifier gate in at least one of the other rectifier gate paths in order to ignite this latter rectifier gate path.

2. Means according to claim 1, at least one of said parallel-working rectifier gate paths comprising a plurality of series-connected rectifier gates, only one of the rectifier gates of said rectifier gate path being supplied with ignition pulses from said pulse device, means responsive to the ignition of such rectifier gate which is ignited directly by said pulse device to ignite all other rectifier gates of the same rectifier gate path, said means comprising a condenser and a resistance connected in series between the cathode of one rectifier gate and the ignition electrode of the rectifier gate whose cathode is connected to the anode of said first-mentioned rectifier gate.

3. Means according to claim 1, one end of the current equalizing reactance of each of said parallel-working rectifier paths being connected to the ignition electrode of a rectifier gate in another of said parallel-working rectifier gate paths in order to ignite this latter rectifier gate path.

4. Means according to claim 3, having means connecting one end of the current-equalizing reactance of each of said parallel-working rectifier gate paths to the ignition electrode of a rectifier gate in another of said parallel-working rectifier gate paths, whereby a closed ignition chain is formed.

5. Means according to claim 1, said pulse device being connected to the ignition electrode of a rectifier gate in each of said parallel-working rectifier gate paths.

6. Means according to claim 1, the connection between the current-equalizing reactance means of one rectifier gate path and the ignition electrode of a rectifier gate in another parallel-working rectifier gate path comprising a series capacitor to limit the power supplied to said ignition electrode.

References Cited by the Examiner

UNITED STATES PATENTS 3,158,799  11/1964  Kelley et al. _____ 307—88.5 X
3,169,232  2/1965   Engman et al. _____ 307—88.5

OTHER REFERENCES

GE Controlled Rectifier Manual, 1st edition, 1960, pages 75, 78 to 81, 155 to 157.

ARTHUR GAUSS, *Primary Examiner*.

JOHN W. HUCKERT, *Examiner*.